Aug. 16, 1966  E. ANDERSEN  3,266,145
PLANT FOR THE MANUFACTURE OF CHEESE
Filed Dec. 13, 1963  2 Sheets-Sheet 1
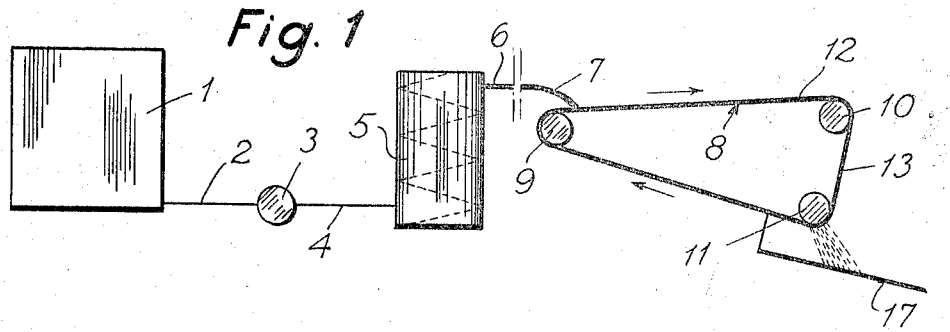
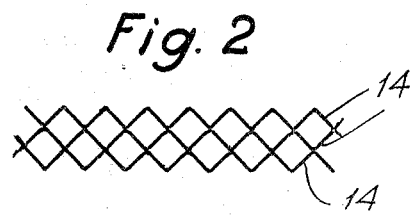
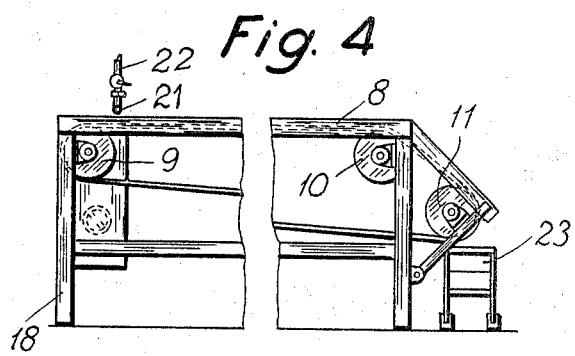
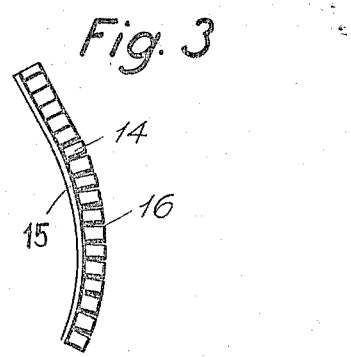
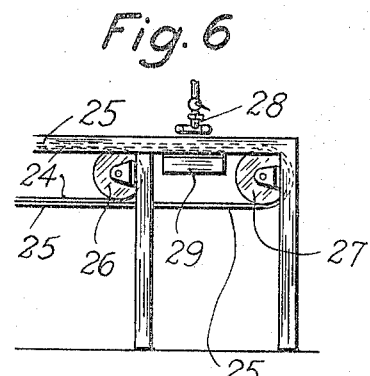
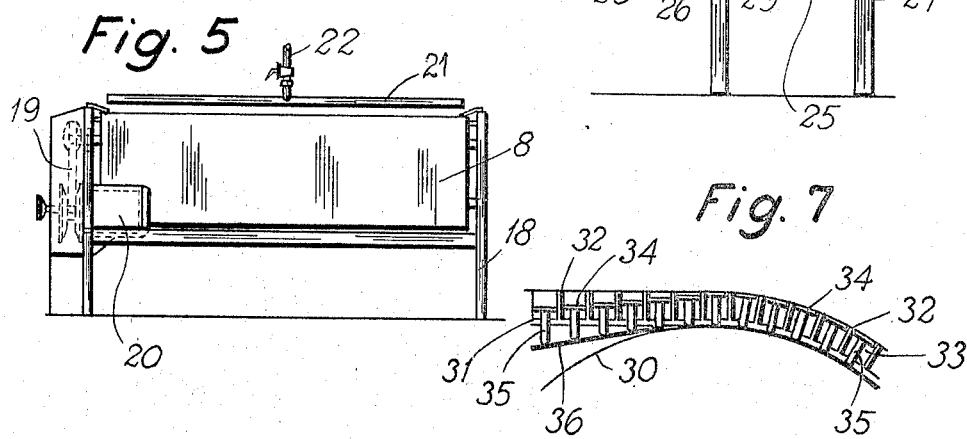
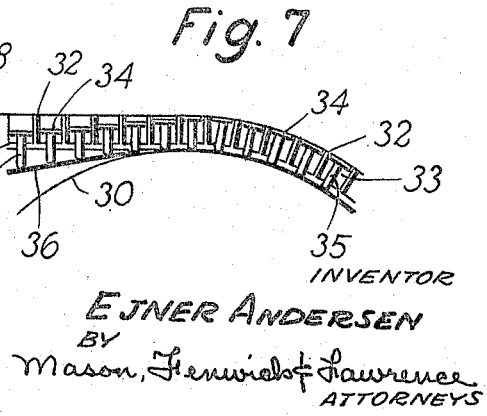
INVENTOR
EJNER ANDERSEN
BY
Mason, Fenwick & Lawrence
ATTORNEYS Aug. 16, 1966 E. ANDERSEN 3,266,145
PLANT FOR THE MANUFACTURE OF CHEESE
Filed Dec. 13, 1963 2 Sheets-Sheet 2
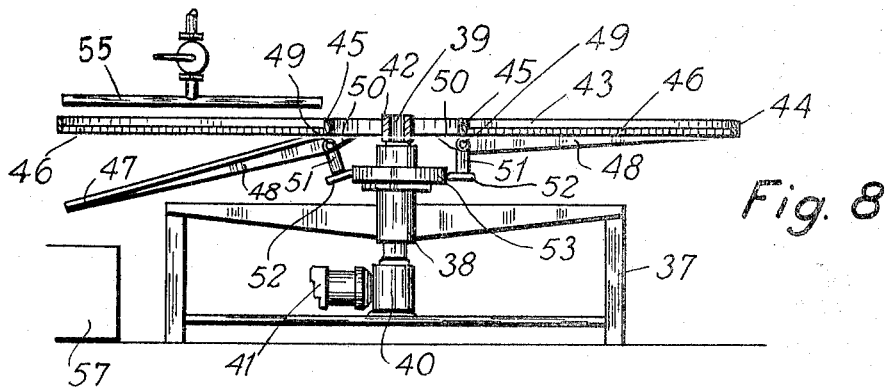
Fig. 8
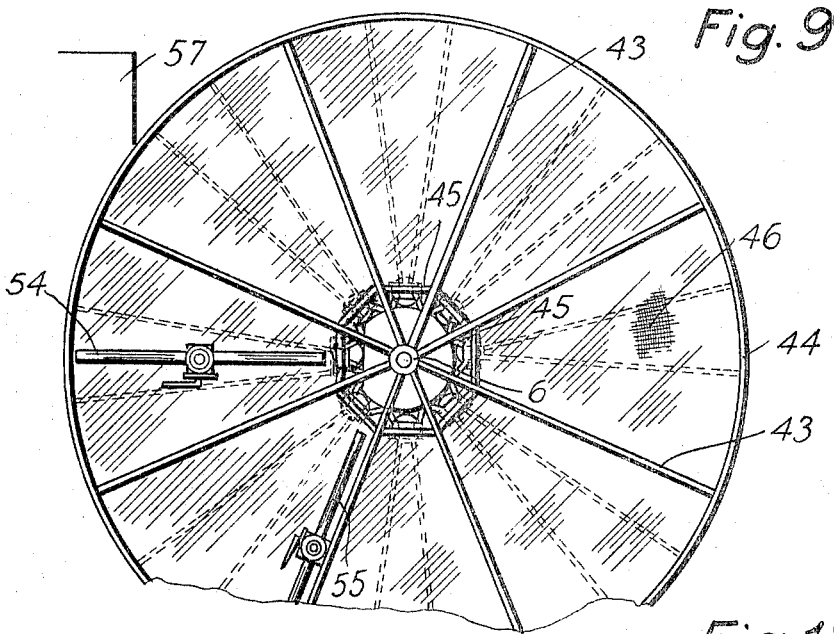
Fig. 9
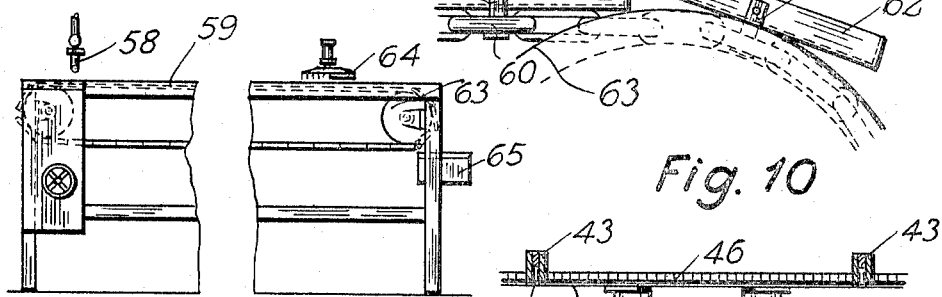
Fig. 11
Fig. 12
Fig. 10
INVENTOR
EJNER ANDERSEN
BY Mason, Fenwick & Lawrence
ATTORNEYS

United States Patent Office 3,266,145
Patented August 16, 1966

3,266,145
PLANT FOR THE MANUFACTURE OF CHEESE
Ejner Andersen, Horsens, Denmark, assignor to Aktieselskabet Paasch & Silkeborg Maskinfabrikker, Silkeborg, Denmark, a Danish corporation
Filed Dec. 13, 1963, Ser. No. 330,458
Claims priority, application Denmark, Dec. 15, 1962, 5,452
6 Claims. (Cl. 31—44)

This invention relates to a plant for the manufacture of cheese in which butter milk which has been subjected to a preliminary treatment, for example, by an admixture of rennet and a culture of bacteria, is caused to coagulate, the particles of the coagulation being subsequently passed to an apparatus for separating off the whey and then pressed into cheese.

In known plants of this kind the butter milk is, after rennet and a culture of bacteria having been added, left in a state of perfect rest for about 30 minutes at about 32° C. During this time the milk coagulates, forming a curd, which is then cut into small cubes by hand.

Attempts have been made to mechanise the cheese manufacture and to make the process continuous, and in known plants the time of coagulation has been brought down to a few minutes by cooling the milk to about 3–5° and storing it in an insulated container at this temperature for some hours with rennet and e.g. an acid-producing substance. As a result, there will be an enzyme effect, but no coagulation. By a subsequent quick heating to about 30° coagulation will take place in a very short time. A very important factor is, however, that the milk is brought into a state of complete rest immediately after the heating so that the coagulation may take place in that condition.

In a known plant the heated milk is passed into the bottom section of an upright container which has a mechanism at the bottom adapted to bring the milk into a state of rest. The milk rises in the container during the coagulation and after the coagulation the mass is cut into grains by means of rotating knives.

However, a certain agitation during the introduction of the milk into the said container is inevitable, and thus agitation will continue during the coagulation. To counteract the adverse effect of this agitation the milk must be poured into the container as slowly as possible so that the continuous production is retarded.

It is the object of the present invention to provide a plant of the aforesaid kind adapted in such manner that the coagulation may take place in a continuous process at a comparatively great rate and without any agitation of the milk that may be detrimetal to the production of the curd.

An essential feature of the plant according to the invention is that it comprises an apparatus with at least one continuously moved coagulating mould adapted to receive a comparatively wide, band-shaped layer of milk of a thickness corresponding to the thickness of the curd particles, means being provided at one end of the path of movement of the mould for pouring preliminary treated non-coagulated milk into the mould, whereas at the other end means are provided for withdrawing coagulated material in the form of curd particles and conveying these to the whey separator.

By means of an apparatus of the aforesaid kind the milk is practically cast in a mould of low height, the said mould being simultaneously moved continuously away from the place where the milk is poured into the mould, whereby the milk almost immediately is brought into a state of perfect rest and the layer of milk may during the coagulation be moved swiftly towards the point of discharge.

The coagulating mould may according to the invention consist of a bottom plate with upright partitions to form cells which open upwardly and correspond to the desired curd particles.

In such a plant the milk is practically cast in small moulds, each forming one curd particle; thus, any agitation of the milk is avoided, and, next cutting of the curd, which usually involves loss of the curd and requires time and work, is avoided, too.

According to the invention the coagulating mould may, however, also be adapted to form a continuous plate of coagulated milk, and at one point of the path of movement where the curd is of sufficient rigidity means may be provided for cutting the plate into curd particles.

An embodiment of a plant according to the invention will now be described with reference to the drawing, in which, FIGURE 1 shows diagrammatically a plant, viewed from the side, FIGURE 2 a part of a coagulating mould, viewed from above, FIGURE 3 a part of the coagulating mould according to FIGURE 2, viewed from the side, FIGURE 4 shows an apparatus with a coagulating mould, viewed from the side, FIGURE 5 the same as FIGURE 4, viewed from the end, FIGURE 6 the rear end of a modified apparatus, FIGURE 7 a part of a modified coagulating mould viewed from the side, FIGURE 8 an apparatus of a modified embodiment viewed from the side, FIGURE 9 the same as FIGURE 8, viewed from above, FIGURE 10 a section through a coagulating mould according to FIGURE 8, FIGURE 11 shows an apparatus of a modified embodiment, viewed from the side, and FIGURE 12 a part of a conveyor band for the apparatus according to FIGURE 11.

Milk cooled to 3–5° C. and to which rennet has been added is poured into a container 1. From the container 1 the milk is passed through a piping 2 to a milk pump 3 which forces the milk through a piping 4 to a plate heat exchanger 5 in which it is heated to about 30° C., and from the apparatus 5 the milk is passed through a piping 6 to a distributor member 7 which is adapted to distribute the milk on a coagulating mould constituting a part of an endless conveyor band 8 which is passed over three rollers 9, 10 and 11 so that the band has a horizontal part 12 and a downwardly directed part 13.

In one embodiment of a plant according to the invention the coagulating mould may have a large number of partitions formed of strips 14 bent in zigzag shape as in FIGURE 2, which shows three such strips 14 bent in zigzag-fashion and extending over the outer side of the conveyor band 9 transversely of same and abutting to each other in such manner as to form a number of cubical cells.

Along their downwardly facing edge the strips 14 are attached to a bottom part 15 (FIGURE 3) lying on top of the conveyor band 8 and constituting the bottom of the coagulating mould.

As appears from FIGURE 3, the strips 14 move away from each other when the conveyor band is moving downwards in a curve, so that wedge-shaped spaces 16 are formed between the strips.

When the preliminarily treated milk is poured through the distributor member 7 into the cells of the coagulating mould which are formed between the strips 14 (FIGURE 2), the milk will at once be brought into a state of rest and during the movement to the right in FIGURE 1 the coagulation will take place so that in each cubical cell there will be formed a piece of cubical curd having the size of the desired curd particles and during the movement from the roller 10 to the roller 11 the said moulds spread as shown in FIGURE 3 so that the curd particles may fall from the mould on to an inclined skid 17.

FIGURES 4 and 5 show an embodiment of an apparatus with a conveyor band 8. A frame 18 carries three rollers 9, 10 and 11 over which the conveyor band 8 is passed. The roller 9 is rotated slowly by means of a belt drive 19 driven by a motor 20 and adapted for stepless regulation. The roller 11 is suspended in such manner that the band 8 is kept tight. The milk is poured on to the coagulating mould through a distributor pipe 21 having downwardly directed nozzle heads, the milk being fed to the said pipe through a piping 22. The curd particles falling out at the roller 11 are conveyed further by a conveyor 23.

FIGURE 6 shows another embodiment of an apparatus in which the coagulating mould is divided into two parts, that is, a bottom designed as a conveyor band 24, and upright cell walls standing on same and forming another band 25. The firstmentioned band is passed over a roller 26, whereas the lastmentioned band is passed over another roller 27 spaced from the firstmentioned roller. In the space between the rollers is provided a spray pipe 28 with downwardly projecting nozzles. Below the said pipe is mounted a discharge skid 29.

The apparatus according to FIGURE 6 acts in the way that the milk similarly as in the apparatus according to FIGURE 4 is introduced into the cellular, continuous coagulating mould and coagulates before the mould reaches the roller 26. At the said roller the bottom of the mould leaves the remaining part of the mould which is passed on to the roller 27, the cells being now open below too, and when whey is pressed through the spray pipe 28 on to the cells, the curd particles will be pressed out and drop on to the skid 29 together with the whey, after which the mixture is carried away for subsequent separation. When the band 25 formed by the cells has passed the roller 27, the said band is passed to the left to join the band 24 on the underside of the roller 26, and when the two bands thus joined have reached the feeding station (not shown), which corresponds to the left-hand side of FIGURE 4, there will again be a cellular coagulating mould with bottom, in which the milk may be poured, on the upper side of the roller 9.

In FIGURE 7 is illustrated a part of a coagulating mould for a modified design in which the coagulating mould is designed as an endless conveyor band passed over two rollers so that the two parts of the band extend horizontally between the rollers. The periphery of the discharge roller is indicated by 30 in FIGURE 7 and the band consists of a bottom 31 which is divided by partitions 32 into cells 33 in each of which there is provided a piston 34 with a piston rod 35 extending through a hole in the bottom 31.

On the upper horizontal length of the conveyor band the pistons 34 will owing to their gravity lie at the bottom of the cells which may thus be filled with milk in the manner previously described. When the milk has coagulated and the coagulating mould is approaching the roller 30, the ends of the piston rods 35 will run on to a cam path 36 which moves the pistons upwards, whereby the curd cubes are pressed out of the cellular compartments of the coagulating mould and the cubes may then drop into a discharge passage.

FIGURES 8–10 show another design of a coagulating apparatus in which the coagulating mould instead of performing a rectilinear movement moves in a circle like a roundabout. On a frame 37 is mounted a bearing housing 38 for a vertical shaft 39 driven by an electromotor 41 through a gearbox 40. At its upper end the shaft 3 has a hub 42 on which there is a number of radial arms 43 connected with each other by means of a ring 44 and bars 45. The result obtained is a number of segments of a circle limited by the arms 43, arched sections 44 and bars 45. In the said segments are mounted plates of cellular structure corresponding to FIGURE 2 and the said plates are denoted by 46. Beneath the said plates are provided bottom plates 47 carried by brackets 48 pivotally connected at 49 with other brackets 50 which are attached to the arms 43.

To each bracket 48 is attached an arm 51 on the free end of which is pivotally resting a cam follower 52 in the shape of a wheel cooperating with a cam path 53 which is attached to the frame 37.

Above the aforesaid roundabout disc is placed a radial feeding pipe 54 for butter milk with downwardly projecting nozzles, and spaced from the said pipe is another radial pipe 55 for whey for washing out the curd particles.

The bottom plates 47 are of the same segment shape as the cellular plates 46 and have bent edges 56, FIGURE 10, projecting into recesses provided in the arms 43 when the bottom plates are in horizontal position.

The turntable or roundabout described rotates continuously in clockwise direction and the segment-shaped bottom plate 47 which is located beneath the feeding pipe 54 will be passed into horizontal position by the cam path 53, the cam follower 52, the arm 51 and the bracket 48 so that beneath the pipe 54 there is located a cellular coagulating mould with bottom. The milk is poured into the said mould and coagulates during the continued rotation of the turntable. When the aforesaid segment-shaped part of the coagulating mould gets into a position close to the discharge pipe 55, the cam path passes it into a downward-swung position shown to the left in FIGURE 8, and when whey is subsequently pressed through the nozzles on the underside of the pipe 55, the curd particles will be pressed out of the cells and fall down on the inclined plate 47 from which they may slide down into a conveyor 57. As soon as the mould has been emptied, the bottom plate 47 will again be passed into horizontal position by the cam path 53 so that there is again an empty coagulating mould with bottom beneath the feeding pipe 54. The bent edges 56 of the bottom 47 prevent the particles and the whey from falling off along the sides of the bottom.

FIGURES 11 and 12 show an apparatus in which preliminarily treated butter milk is poured in usual manner through a pipe 58 into a coagulating mould 59, which is shown in FIGURE 12 and consists of a chain 60 to which are attached wide coagulating moulds 62 by means of supports 61. The said moulds 62 are without cell walls so that there is formed a continuous layer or curd throughout the length and width of the whole mould.

Close to the discharge roller 63 is provided a cutting apparatus 64 which is provided with cell walls and is passed into each mould 62 so that the curd in the mould is cut into cubes which are subsequently ejected at the roller 63 into a conveyor 65. If desired, there may be pressing devices for forcing the cubes out of the mould. The apparatus 64 may also, if desired, be provided with ejector means for removing such curd particles as are sticking to the cutting device.

What I claim and desire to secure by Letters Patent is:

1. A plant for the continuous manufacture of cheese from milk which has been subjected to a preliminary treatment for coagulation comprising: endless flexible means having a plurality of mutually adjacent substantially small coagulating moulds comprising cells of a cross-section, each corresponding to a coagulating grain of a desired small shape, said cells formed by partitions fixed to said flexible means, means for continuously moving said first named means with said moulds, at least one wide mouth dispensing spout positioned for feeding pre-treated uncoagulated milk to said small moulds as said small moulds pass beneath said spout, and means for removing whole each of the coagulating grains of said desired small shape from said endless flexible means, and means for receiving said whole coagulating grains to later form a cheese mass.

2. A plant as claimed in claim 1, wherein the coagulating mould consists of a bottom plate with upright partitions to form upwardly open cells corresponding to the desired small shape of the coagulating grain.

3. A plant as claimed in claim 2, wherein the cells are provided with movable pistons and piston rods extending through a hole in the bottom of the cell, control means including cam paths for the piston rods whereby during the filling operation and the coagulation the said piston rods are located at the bottom of the cell and at the point of discharge of the grains are moved towards the open end of the cell.

4. A plant as claimed in claim 2, and including a pair of spaced rollers and wherein the bottom plate is flexible and loose in relation to the cell walls and is passed over one of said rollers disposed before the point of removal, said endless flexible means passing over the other of said rollers so that the partitions between the two rollers are moving alone with the solidified grains and spout means for whey over the partitions for pressing out the grains.

5. A plant as claimed in claim 1, wherein the partitions consist of strips connected so that when the mould turns at the point of discharge, said strips are moved in relation to each other so that the cells open to permit the coagulating grains to fall out when the cells are facing partly downwards.

6. A plant as claimed in claim 5, wherein the strips are bent into zigzag shape and extend transversely of the direction of movement of the flexible means, adjacent pairs of the said strips forming cubical cells thereby that two edges facing each other are abutting.

References Cited by the Examiner
UNITED STATES PATENTS

| | | | |
|---|---|---|---|
| 2,564,715 | 8/1951 | North | 31—89 |
| 2,657,993 | 11/1953 | Arkin | 99—116 |
| 2,846,767 | 8/1958 | Hensgen et al. | 31—48 |
| 2,907,109 | 10/1959 | Palmer | 31—14 |
| 2,917,827 | 12/1959 | Lankford | 31—46 |

SAMUEL KOREN, *Primary Examiner.*

HUGH R. CHAMBLEE, *Assistant Examiner.*